US010424111B2

(12) United States Patent
Stacey

(10) Patent No.: US 10,424,111 B2
(45) Date of Patent: Sep. 24, 2019

(54) SPLIT TILE MAP RENDERING

(71) Applicant: GOOGLE LLC, Mountain View, CA (US)

(72) Inventor: Damon Edward Kirk Stacey, Bondi Junction (AU)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/979,036

(22) Filed: May 14, 2018

(65) Prior Publication Data

US 2018/0261007 A1 Sep. 13, 2018

Related U.S. Application Data

(63) Continuation of application No. 14/971,713, filed on Dec. 16, 2015, now Pat. No. 9,972,125.

(51) Int. Cl.
| G06T 9/00 | (2006.01) |
| G06T 17/05 | (2011.01) |
| G06T 3/40 | (2006.01) |
| G06T 11/60 | (2006.01) |
| G06F 16/29 | (2019.01) |

(52) U.S. Cl.
CPC .............. G06T 17/05 (2013.01); G06F 16/29 (2019.01); G06T 3/4092 (2013.01); G06T 9/00 (2013.01); G06T 11/60 (2013.01); G06T 2200/16 (2013.01); G06T 2200/28 (2013.01); G06T 2200/32 (2013.01); G06T 2210/36 (2013.01)

(58) Field of Classification Search
CPC  G06F 17/30241; G06T 17/05; G06T 2210/36

USPC ........................................................ 345/634
See application file for complete search history.

(56) References Cited

U.S. PATENT DOCUMENTS

| 5,902,347 | A | 5/1999 | Backman et al. |
| 7,734,412 | B2 | 6/2010 | Shi et al. |
| 7,894,984 | B2 | 2/2011 | Rasmussen et al. |
| 8,799,799 | B1 | 8/2014 | Cervelli et al. |
| 8,894,984 | B2 | 11/2014 | Schulze zur Wiesche et al. |
| 9,972,125 | B2 | 5/2018 | Stacey |
| 2003/0231190 | A1 | 12/2003 | Jawerth et al. |
| 2007/0124065 | A1 | 5/2007 | Ho et al. |

(Continued)

OTHER PUBLICATIONS

Ageenko et al., "On the Size and Shape of Multi-Level Context Templates for Compression of Map Images," Proceedings 2001 International Conference on Image Processing, 3:458-461 (2001).

(Continued)

*Primary Examiner* — Thomas J Lett
(74) *Attorney, Agent, or Firm* — Marshall, Gerstein & Borun LLP

(57) ABSTRACT

A client device receives a request to render a digital map of a certain geographic area. The client device retrieves a first map image layer covering the geographic area from a memory of the client device, where the first map image layer has a first resolution, and receives a second map image layer covering the same geographic area from the map server, where the second map image layer has a second resolution different from the first resolution. The client device combines the first map image layer retrieved from the memory of the client device with the second map image layer received from the map server to generate a single digital map of the geographic area.

20 Claims, 6 Drawing Sheets

(56) References Cited

U.S. PATENT DOCUMENTS

| | | |
|---|---|---|
| 2007/0139411 A1 | 6/2007 | Jawerth et al. |
| 2008/0059889 A1 | 3/2008 | Parker et al. |
| 2009/0128560 A1* | 5/2009 | Schechter ............. G06T 11/001 345/421 |
| 2010/0013673 A1 | 1/2010 | Blais |
| 2010/0321399 A1 | 12/2010 | Ellren et al. |
| 2011/0004828 A1 | 1/2011 | Callicrate et al. |
| 2011/0270833 A1 | 11/2011 | von Kaenel et al. |
| 2013/0339891 A1* | 12/2013 | Blumenberg .......... G01C 21/26 715/771 |
| 2014/0211015 A1 | 7/2014 | Meadow et al. |
| 2015/0193630 A1 | 7/2015 | Von Kaenel et al. |
| 2015/0262399 A1 | 9/2015 | Popescu |

OTHER PUBLICATIONS

Akimov, "Compression of Digital Maps," University of Joensuu Computer Science Disserations 15 (2006).

de Queiroz et al., "Mixed Raster Content (MRC) Model for Compound Image Compression," Proc. EI99, VCIP, SPIE (1999).

International Search Report and Written Opinion for Application No. PCT/US2016/066789, dated Mar. 22, 2017.

\* cited by examiner

SPLIT TILE MAP RENDERING

CROSS-REFERENCE TO RELATED APPLICATION

This application is a continuation of U.S. patent application Ser. No. 14/971,713, filed Dec. 16, 2015, the disclosure of which is incorporated herein by reference in its entirety for all purposes.

FIELD OF THE DISCLOSURE

The present disclosure relates to interactive digital maps and, more particularly, to efficiently transferring raster map images to client devices via communication networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Interactive digital maps, which various geographic applications display on computing devices, generally depict numerous geographic features, such as roads, outlines of countries and towns, bodies of water, buildings, etc. Geographic features displayed as part of a digital map can have different appearance at different levels of magnification of the digital map, commonly referred to as "zoom levels." A digital map can be made up of several tiles, or portions of a certain fixed size, typically dependent on the zoom level.

Generally speaking, map servers can provide map data to client devices as map images in raster formats, according to which map images are described in terms of pixels, or in a scalable formats that rely on mathematical descriptions of shapes (e.g., the vector graphics format). In the former case, map images are generally ready for display on client devices. In the latter case, client devices first interpret map data locally to generate raster map images, at a relatively high computational cost, and only then display these map images.

Transmitting map data in an image format generally takes up a significant amount of bandwidth, and compressing map image data either results in a loss of quality users can easily notice, or requires the use of lossless algorithms that do not provide significant savings in bandwidth. Meanwhile, the proliferation of high-resolution screens in portable and non-portable devices causes content providers, including providers of interactive digital maps, to transmit large, high-resolution images to client devices.

SUMMARY

To make transmission of image map data more efficient, and to better support client-side zooming, the map server selects map data that makes a map image and generates multiple image layers for the same geographic area, with each image layer illustrating a certain type of geographic data and having a resolution selected in view of the type of geographic data. For example, the map server can generate a 128-by-128 pixel base image layer, with the base image layer illustrating geological formations such as large bodies of water, shorelines, forests, deserts, etc., for a certain map tile. For the same map tile, the map server can generate a 256-by-256 pixel road image layer to illustrate roads, traffic conditions, etc., and a 512-by-512 pixel label image layer to illustrate labels. The map server then can apply compression to at least some of the image layers. Moreover, the map server can choose a compression algorithm for a particular image layer based on the type of geographic data illustrated in the image layer. For example, the map server can apply lossy compression to the base image layer illustrating water, forests, etc.

One embodiment of these techniques is a method for efficiently transmitting image map data to client devices. The method includes selecting map data for rendering a digital map of a certain geographic area at a client device and generating multiple map image layers using the selected map data, each covering the geographic area. Generating the multiple map image layers includes generating (i) a first map image layer including a first type of geographic data and having a first resolution, and (ii) a second map image layer including a second type of geographic data and having a second resolution. The method further includes transmitting the multiple map image layers to the client device via a communication network for generating a single digital map of the geographic area.

Another embodiment of these techniques is method in client devices for rendering digital maps. The method includes requesting, from a map server, map data for rendering a digital map of a certain geographic area at a client device. The method further includes receiving multiple map image layers, each covering the geographic area, including (i) a first map image layer including a first type of geographic data and having a first resolution, and (ii) a second map image layer including a second type of geographic data and having a second resolution. The method also includes generating a single map image from the multiple map image layers to generating a single digital map of the geographic area.

Yet another embodiment of these techniques is a computing device comprising one or more processors, a display device communicatively coupled to the one or more processors, and a non-transitory computer-readable medium storing instructions. When executed by the one or more processors, the instructions cause the computing device to receive a first map image layer including a first type of geographic data and having a first resolution, for a certain geographic area, receive a second map image layer including a second type of geographic data and having a second resolution, for the same geographic area, combine the first map image layer and the second map image layer to generate a map image of the geographic area, and display the map image via the display device.

Still another embodiment of these techniques is a map server comprising a network interface to communicate with client devices via a communication network, a database interface to access a map database storing geospatial data for generating digital map, and a processing hardware. The processing hardware is configured to select map data for rendering a digital map of a certain geographic area at a client device, generate multiple map image layers using the selected map data, each covering the geographic area, and transmit the multiple map image layers to the client device via a communication network for generating a single digital map of the geographic area. To generate the multiple map image layers, the processing hardware is configured to generate (i) a first map image layer including a first type of geographic data and having a first resolution and (ii) a second map image layer including a second type of geographic data and having a second resolution.

DETAILED DESCRIPTION

Figure 1:
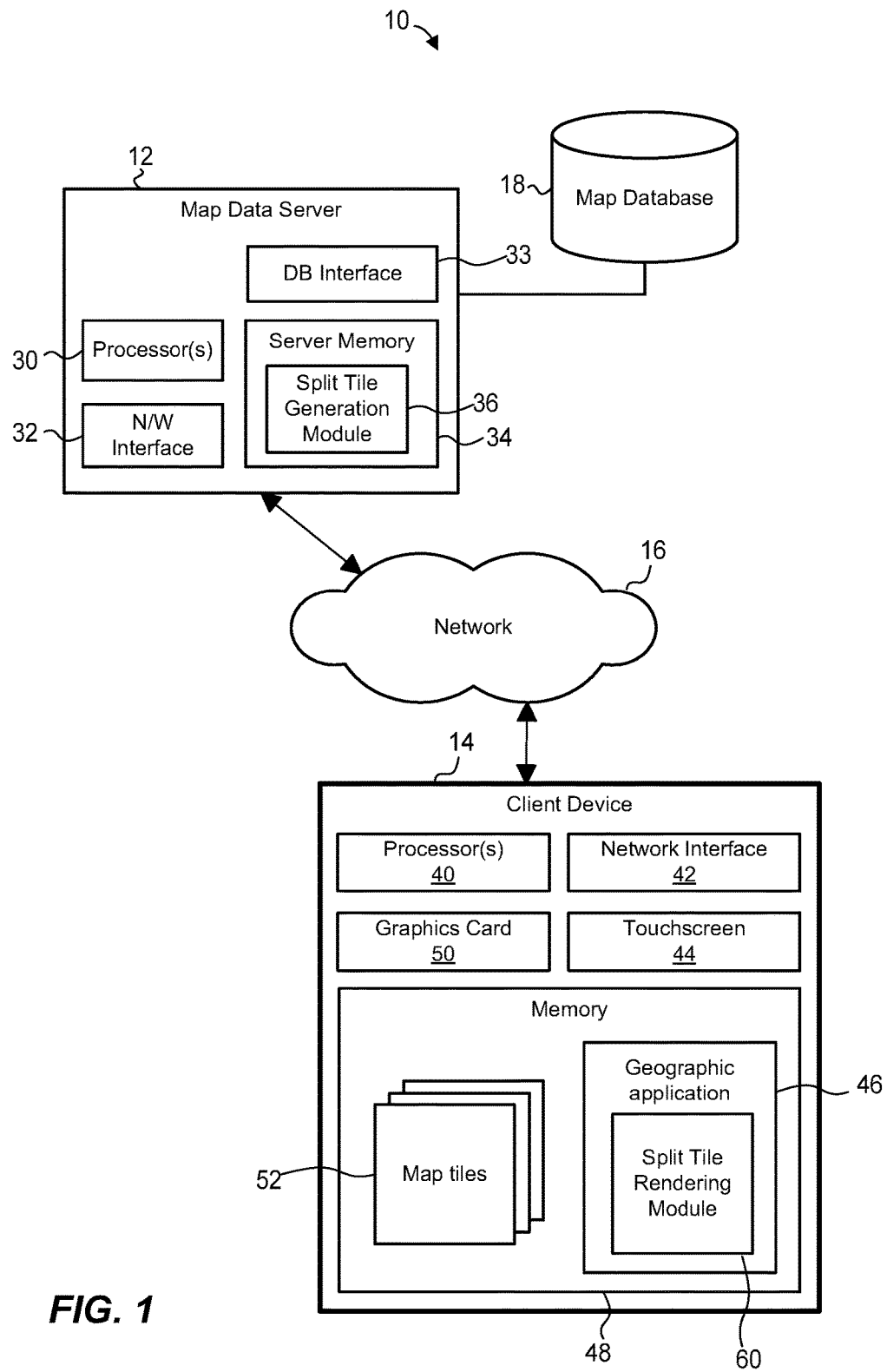
FIG. 1 is a block diagram of an example computing system in which techniques for generating map images using different map image layers can be implemented.

FIG. 1 is a block diagram of an example computing system 10 in which a map data server 12 provides map data to a client device 14 via a communication network 16 for rendering an interactive digital map using the split tile techniques of this disclosure. The map data server 12 is coupled to a map database 18 storing map data.

The map data server 12 can be implemented as a single device or as a group of devices. One or more of these devices can include one or more processors 30, a network interface 32, a database interface 33, and a non-transitory computer-readable memory 34 that stores instructions executable on the one or more processors 30. These instructions can implement, among other software components, a split tile generation module 36 that generates map image layers for use on client devices, as discussed in detail below. More generally, the map data server 12 can include any suitable type of processing hardware configured to generate map image layers of the present disclosure.

The client device 14 can be a desktop computer, a laptop computer, a tablet computer, another type of a portable device such as a smartphone, a wearable device, etc. More generally, the techniques for generating map image layers can be utilized in all suitable computing devices. The client device 14 can include a network interface 42 configured to communicate with the map data server 12 and other devices using any suitable protocols via the network 16, which can be a wide area network (WAN), a local area network (LAN), etc., and can include any suitable number of wired and/or wireless links. The client device 14 also can include a touchscreen 44 configured to receive typed and gesture-based input and to display images generated by various applications executing on the client device 14, including a geographic application 46. In other implementations, the client device 14 can include an output-only display and receive input via a keyboard, a mouse, a microphone, sensors configured to detect 2D and/or 3D gestures, etc. Further, the client device 14 can include one or more general-purpose processors 40, a non-transitory computer-readable memory 48, and a graphics card 50 (e.g., including one or more graphics processing units, or GPUs) with buffers and program memory that stores vertex and pixel shaders. The memory 48 can include persistent components (e.g., a hard disk) as well as non-persistent components (e.g., RAM). In other implementations, the client device 14 may include additional components or, conversely, not include some of the components illustrated in FIG. 1.

In the example implementation illustrated in FIG. 1, the geographic application 46 is stored in the memory 48 as a set of instructions executed by the one or more processors 40. The geographic application 46 can generate interactive digital maps and, depending on the implementation and/or scenario, obtain navigation directions, provide data related to geolocated businesses, retrieve and display geographic commercial data such as coupons and offers, etc. Depending on the implementation, the geographic application 46 can operate as a standalone application or as a component of another application such as a web browser, for example. The geographic application 46 includes a split tile rendering module 60 that operates on raster map tiles 52, as discussed in more detail below.

With continued reference to FIG. 1, the map database 18 can be implemented in a single storage device or multiple storage devices. The map database 18 can store map data that includes descriptions of geometry for various map features such as buildings and other structures, roads, parks, bodies of water, etc. Besides roads designed for vehicles, the map data can describe bicycle paths, pedestrian paths, railway paths, shipping routes, airlines routes, etc. Map features can be defined in a vector graphics format, according to which images are described in terms of geometrical primitives based on mathematical expressions, or another suitable scalable format. Depending on the implementation, map features can be defined in two dimensions (2D) only, in three dimensions (3D) as wireframes to which raster textures are applied, in "two-and-a-half" dimensions (2.5D) as 2D polygons "extruded" into the third dimension, etc. In some cases, map data also can include raster images in a bitmap format, for example. Further, map data also can include text label and various forms of metadata such as links to remote resources.

Further, the map data server 12 can organize and serve map data to client devices using map tiling. Map tiles generally correspond to 2D organization of geospatial data into a quadtree. Each tile at a given zoom level is divided into four tiles at the next level up to the highest level of magnification. Similarly, 3D organization of geospatial data can be implemented using octrees, in which a cubic volume contains map geometry at a certain zoom level and is subdivided into eight cubic volumes at the next zoom level, with each of the eight cubic volumes typically containing a more detailed map geometry. To map the surface of the Earth onto a plane for 2D representation, Mercator or another suitable projection can be used. Although the examples below refer to map data organized into 2D map tiles, the LOD and style parameter determination techniques of this disclosure can be extended to 3D map data organized into octrees.

Unless stated otherwise, the term "map tile" in the discussion below refers to a raster map tile, i.e., an image defined in terms of pixels rather than vectors or other non-pixel indicators.

Figure 2A:
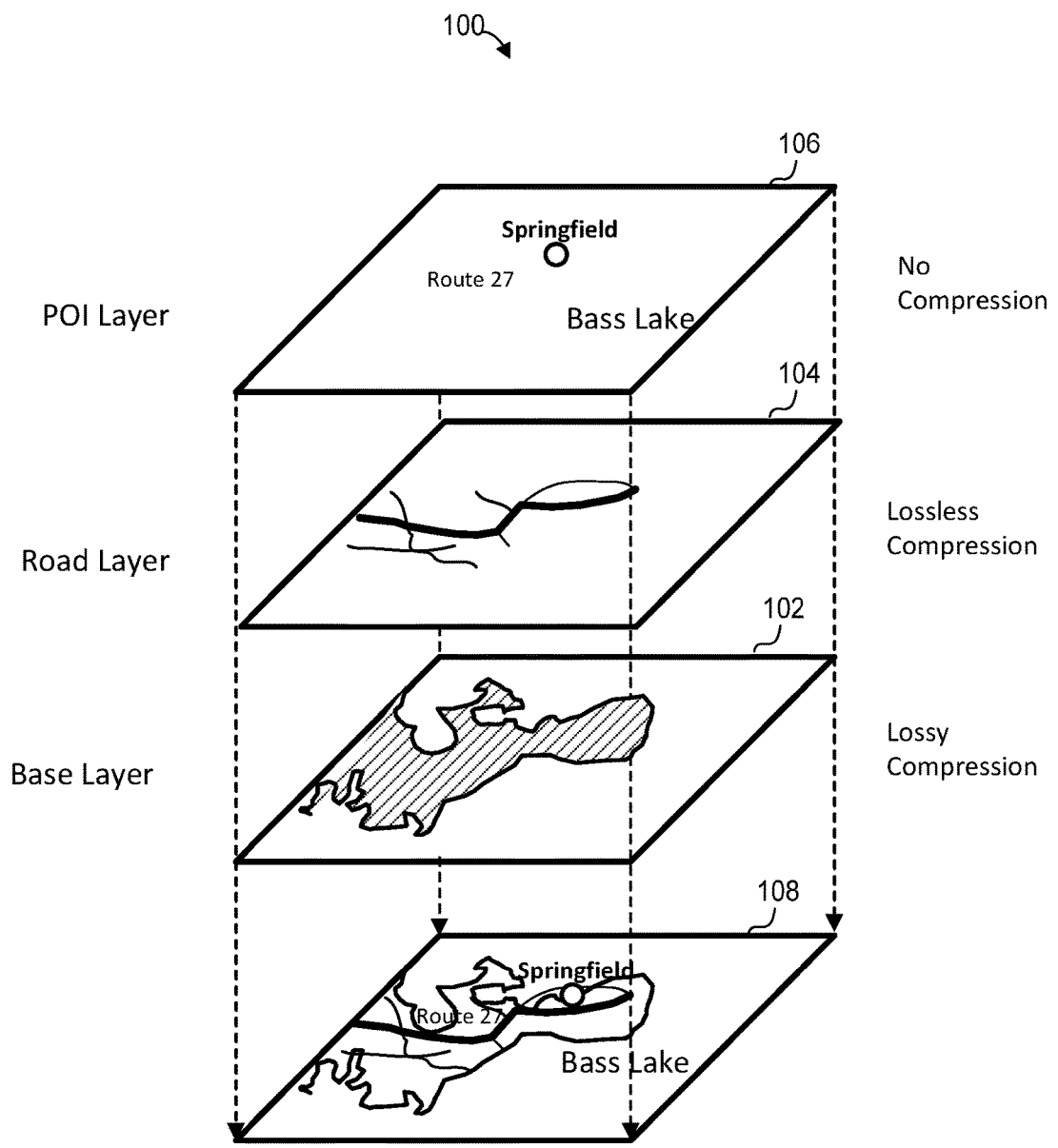
FIG. 2A is a diagram that illustrates generating a map image for a certain geographic area using several different map image layers, which can be implemented in the system of FIG. 1.

In an example scenario, a split tile generation module 36 receives a request for map data from the client device 14, which includes an indication of a geographic area and the desired zoom level. The split tile generation module 36 determines that a raster map image should be provided to the client device 14 (rather than vector data, for example), and retrieves the appropriate map data from the map database 18. Depending on the size of the geographic area for which the client device 14 requested map data, the split tile generation module 36 can retrieve map data for rendering a single map tile or multiple map tiles. The split tile generation module 36 then generates map image layers based on geographic features. The map image layers can directly correspond to map tiles in terms of the geographic area covered, as illustrated in FIG. 2A. Each map image layer can be a raster image with transparent portions for overlay with other map image layers. Further, the map image layers have different resolutions for efficient transmissions.

As a more specific example, a diagram 100 of FIG. 2A illustrates an example set of map image layers 102-106 that add up to a map image 108. Although the diagram 100 depicts three map image layers, in general the split tile generation module 36 can generate, and the split tile rendering module 60 can assemble, any suitable number of map image layers (e.g., 2, 4, 5, 10). The split tile generation module 36 can transmit the layers 102-106 to the client device 14, and the split tile rendering module 60 can assemble the map image 108 from these layers, as the diagram 100 illustrates. For ease of illustration, here each of the layers 102-106 is illustrated as corresponding to a single map tile. However, a map image layer in general can encompass one or several map tiles.

In this example scenario, a base map image layer 102 is a raster image that depicts only bodies of land and water, deserts, forests, and other large features that are generally large. The base map image layer 102 can be generated at a relatively low resolution, such as 128×128 pixels. A road/traffic map image layer 104 depicts roads, transportation lines, traffic, etc. The road/traffic image layer 104 can have a higher resolution of 254×254 pixels, for example. Further, a POI/label layer 106 can depict point of interest, various labels, etc. Experimental data suggests that users assess "crispiness" of map imagery primarily based on the resolution of the text displayed on the maps. Accordingly, the POI/label map image layer 106 can have a relatively high resolution of 512×512 pixels. The map image layers 102-106 correspond to a same geographic area and thus, in a sense, form raster map tiles similar to "complete" map tiles that depict all of the geographic features normally rendered for the geographic area.

To generate the map layer images 102-106, the split tile generation module 36 can select of geographic features from the map database 18 and render only the selected map features to generate a map tile, with the spaces between the relevant map features filled with transparent pixels. Thus, to render the base level 102, for example, the split tile generation module 36 can determine the boundaries of the map tile, locate in the map database 18 geographic features of a certain type (in this case, ocean, sea, lake, forest, desert, etc.) and render only these geographic features, without rendering geographic features of other types that may be located in the same geographic region.

When transmitting the map image layers 102-106 to the client device 14, the split tile generation module 36 can apply compression techniques to the map image layers in view of the type of geographic type included in the map image layer. For example, the base map image layer can "afford" lossy compression because it primarily contains large patches of the same color, and the loss is quality is not very perceptible. The split tile generation module 36 can apply lossless compression to the other layers. As another example, the split tile generation module 36 can apply lossless compression to the layer road 106, and no compression to the POI layer 104. More generally, the split tile generation module 36 can apply different combinations of lossy, lossless, or no compression to different map image layers that make up a map image. The split tile rendering module 60 then can apply corresponding decompression techniques to the image layers 102-106, when necessary. In a typical scenario, the aggregate size of the map image layers 102-106 is smaller than the size of the uncompressed image 108.

In an example implementation, the map data server 12 assigns identifiers of map layer image type to each map layer image 102-106, which the client device 14 recognizes. For example, the map data server 12 and the client device 14 can share constants LAYER_BASE, LAYER_ROADS, LAYER_POI, etc. Using these identifiers, the split tile rendering module 60 determines the type of geographic information contained in the map image layer, the resolution of the map image layer, the type of decompression to apply to the map image layer, etc. Further, the split tile rendering module 60 can use these identifiers to determine how the map image layers should be overlaid. For example, if two map image layers specify non-transparent colors for a certain pixel, the split tile rendering module 60 can use the identifiers to determine the relative priority of these layers. In the example of FIG. 2A, the POI layer 106 overlays the road layer 105, which in turn overlays the base layer 108.

Upon receiving the map image layers 102-106, the client device 14 can store the map image layers 102-106 in the memory 48 as map tiles 52. The client device 14 can apply a caching and storage policy to map tiles 52 depending on the type of information included in the map tile. For example, the client device 12 can store the base map image layer 102 and similar tiles for a relatively long time, so that the base map image layer 102 can be reused when the zooming the digital map to a level unavailable at the client device 14. In other words, the client device 12 can use the base map image layer 102, which may be associated with zoom level Z, when rendering a digital map at zoom levels Z, Z+1 and Z+2, for example. However, the, the client device 12 can use the POI map image layer 104, which also may be associated with zoom level Z, only at zoom level Z. Accordingly, the client device 14 can apply a different caching and purging policy to the layers 102 and 104.

With continued reference to FIGS. 1 and 2A, the split tile rendering module 60 can assemble the map image 108, corresponding to a complete raster map tile, by overlaying the map image layers 102, 104, and 106. Because each of the map image layers 102, 104, and 106 typically includes large transparent portions, and because at least some of the map image layers 102, 104, and 106 can be compressed, the overall amount of data the map server 12 transmits to the client device 14 is decreased.

Figure 2B:
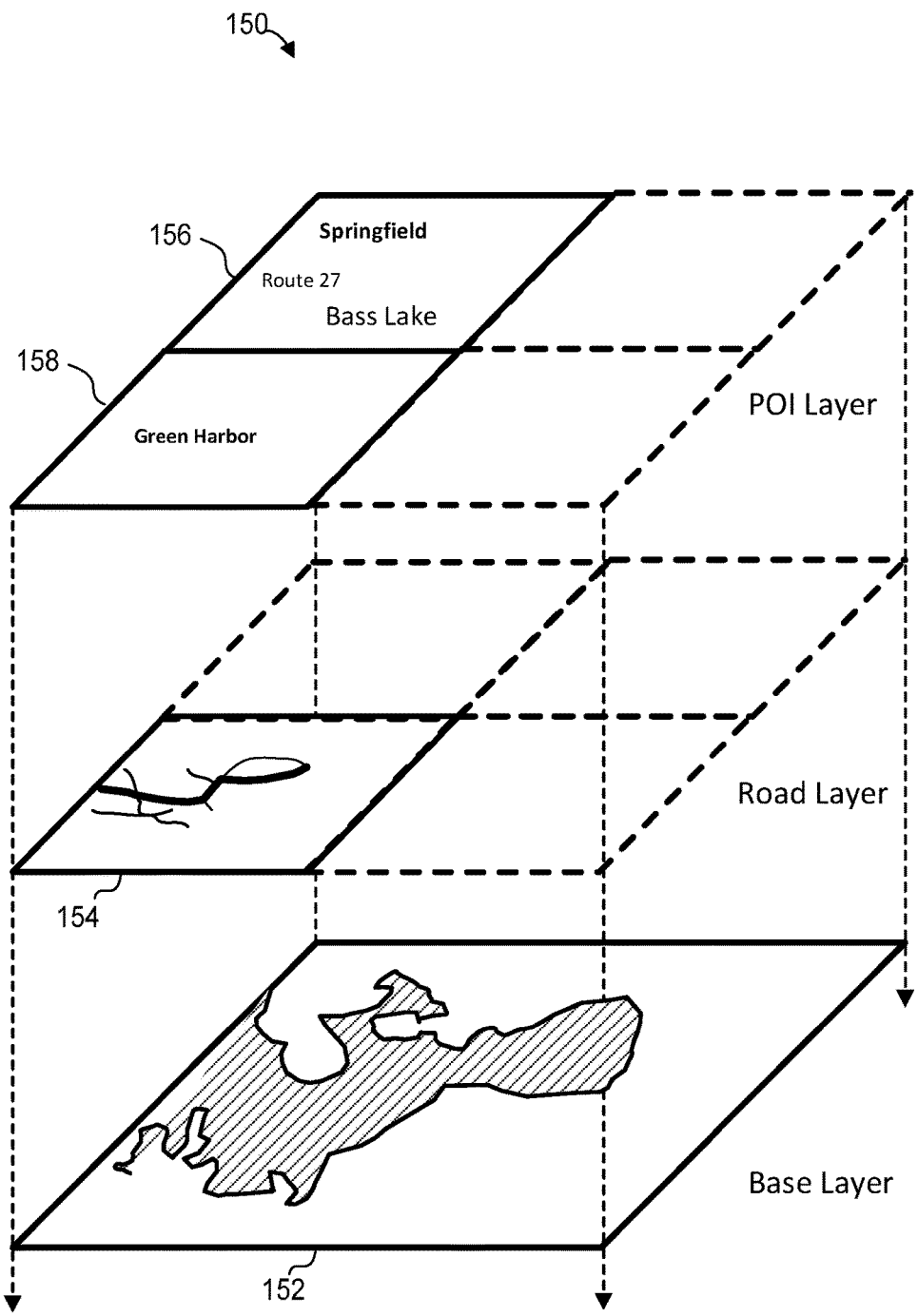
FIG. 2B is a diagram that illustrates generating a map image using several different map image layers corresponding to overlapping but different geographic areas, which can be implemented in the system of FIG. 1.

Now referring to a diagram 150 in FIG. 2B, the split tile rendering module 60 in some cases can assemble map images using previously received map image layers, rescaled to match a new zoom level, and new map image layers received from the map data server 12. In this example, a base map image layer, a road map image layer and a POI map image layer are assembled to generate a map image at zoom level Z. The size of a map tile at this zoom level corresponds is the size of a map tile 154, 156, or 158. However, the base map image layer in this case is made up of a single map tile 152, which can be a base map image layer defining a tile at zoom level Z-1 and rescaled to the zoom level Z. For example, the split tile rendering module 60 can expand the source base map image layer by replicating each pixel four times (e.g., copying pixel Px, y in the source image to Px, y, Px+1, y, Px, y+1, Px+1, y+1 in the target image or using a more sophisticated technique). Because the base map image layer primarily illustrates large geological formations such as shorelines and bodies of water, tiles corresponding to this layer can be expanded with a relatively small visual impact on the resulting map image.

The split tile rendering module 60 overlays a tile 154 defining a road image layer on the appropriate portion of the map tile 152. It is noted that because no roads exists in the geographic region corresponding to the remaining portions of the map tile 152, the tile rendering module 60 overlays no other tiles at the road map image layer on the tile 152. For the same reason, at the POI map image layer, the tile rendering module 60 overlays only two tiles, 156 and 158, on the tile 152.

In an example scenario consistent with the diagram 150, the split tile rendering module 60 or another component of the geographic application 46 detects a change in the zoom level of the digital map from Z to Z+1. For example, the user can zoom in on a portion of the map by operating a UI control or applying a gesture via the touchscreen 44. In response, the split tile rendering module 60 can retrieve a zoom-level-Z tile corresponding to the scalable map image layer (e.g., the base map image layer) from the local memory 48, quickly rescale the tile, and render the rescaled tile. Meanwhile, the client device can request map tile(s) from the map server 12 to "properly" render the digital map at the new zoom level Z+1. The map server 12 can transmit the map tiles as separate map image layers. Depending on the implementation and/or the scenario, the map server 12 can prioritize the transmission so that tiles corresponding to the unscalable map image layer(s) (e.g., the road map image layer) arrive at the client device 14 first, followed by the scalable map image layer(s), or not transmit tiles for the scalable map image layer(s) at all. In either case, the client device 14 can (i) first display the base map image layer at the new zoom level, prior to receiving any new tiles, (ii) overlay the tiles corresponding to the road map image layer and POI man image layer on the base map image layer, and (iv) re-render the base map image layer once new tiles for this layer arrive, or just continue displaying a map image generated from several map image layers originally corresponding to different zoom levels.

Thus, according to the techniques discussed above, certain geographic features are grouped together and rendered into a map image layer to define a raster tile, which subsequently can be rescaled without a significant impact on the visual properties of the digital map. Further according to these techniques, geographic features of other types define other map image layers with different properties. In particular, some map image layers can be uncompressible, some can be compressible with lossy compression techniques to save significant amounts of bandwidth, and some can be compressible with only lossless compression techniques. Another property which can be assigned to each map image layer individually is image resolution. As discussed above, text can be rendered at higher resolution than certain geographic features that typically do not require the same focus from the user (e.g., bodies of water). Still further, tiles corresponding to different map image layers and the same geographic area can be transmitted to client devices with different priorities, and can be managed separately on client devices.

Figure 3:
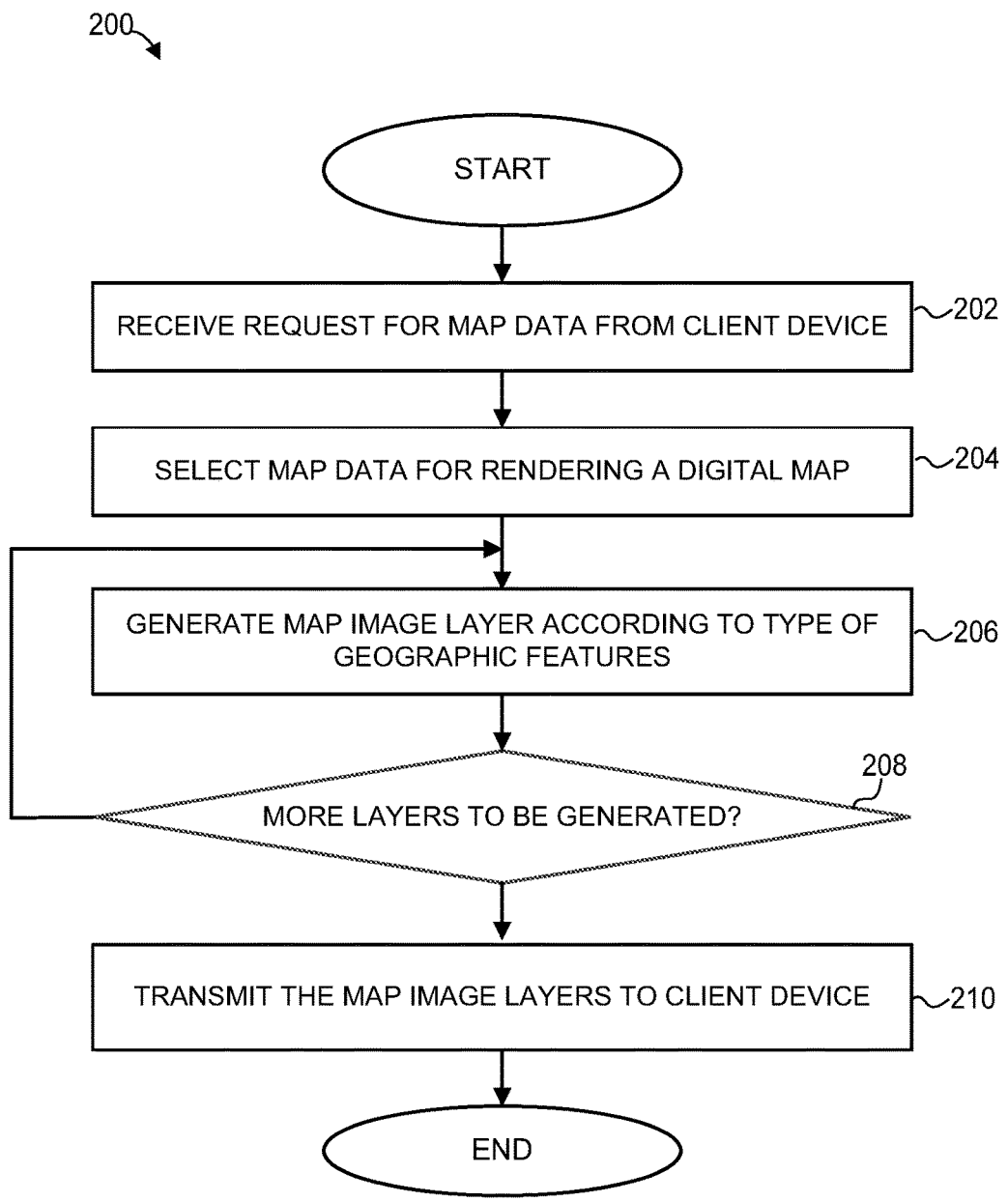
FIG. 3 is a flow diagram of an example method for generating multiple map image layers, which can be implemented in the map server of FIG. 1.
Figure 4:
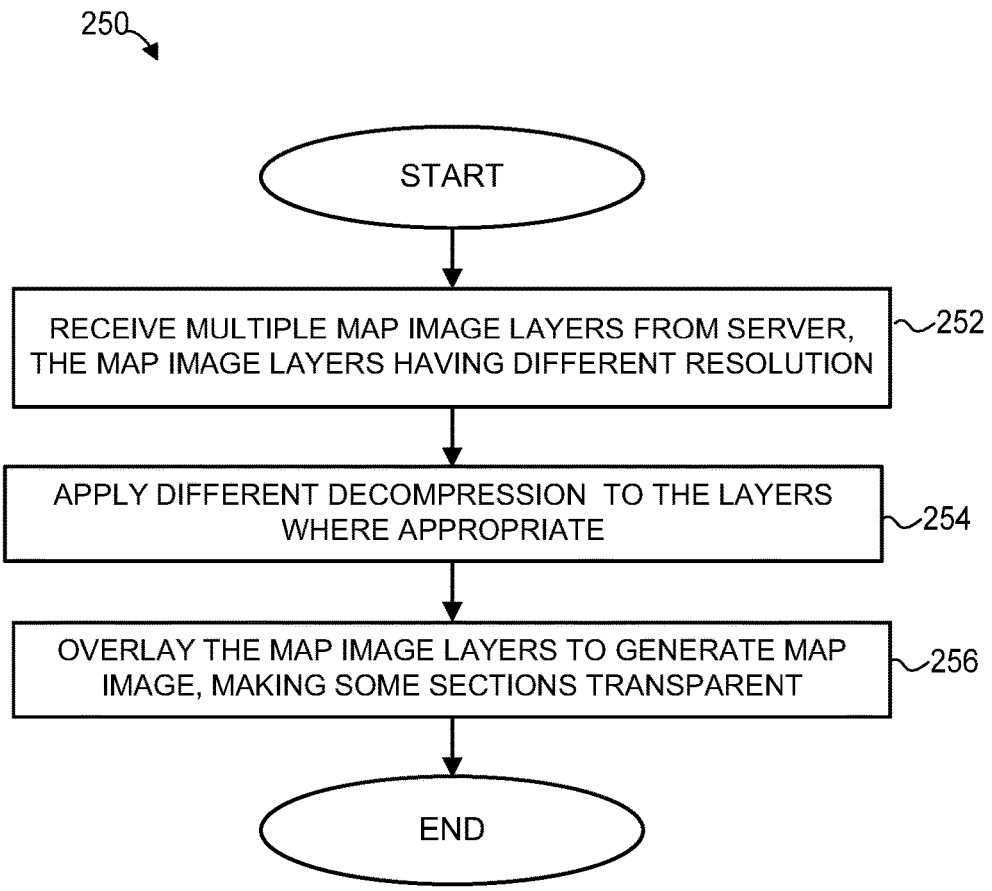
FIG. 4 is a flow diagram of an example method for generating a map image using multiple map image layers, which can be implement in the client device of FIG. 1.
Figure 5:
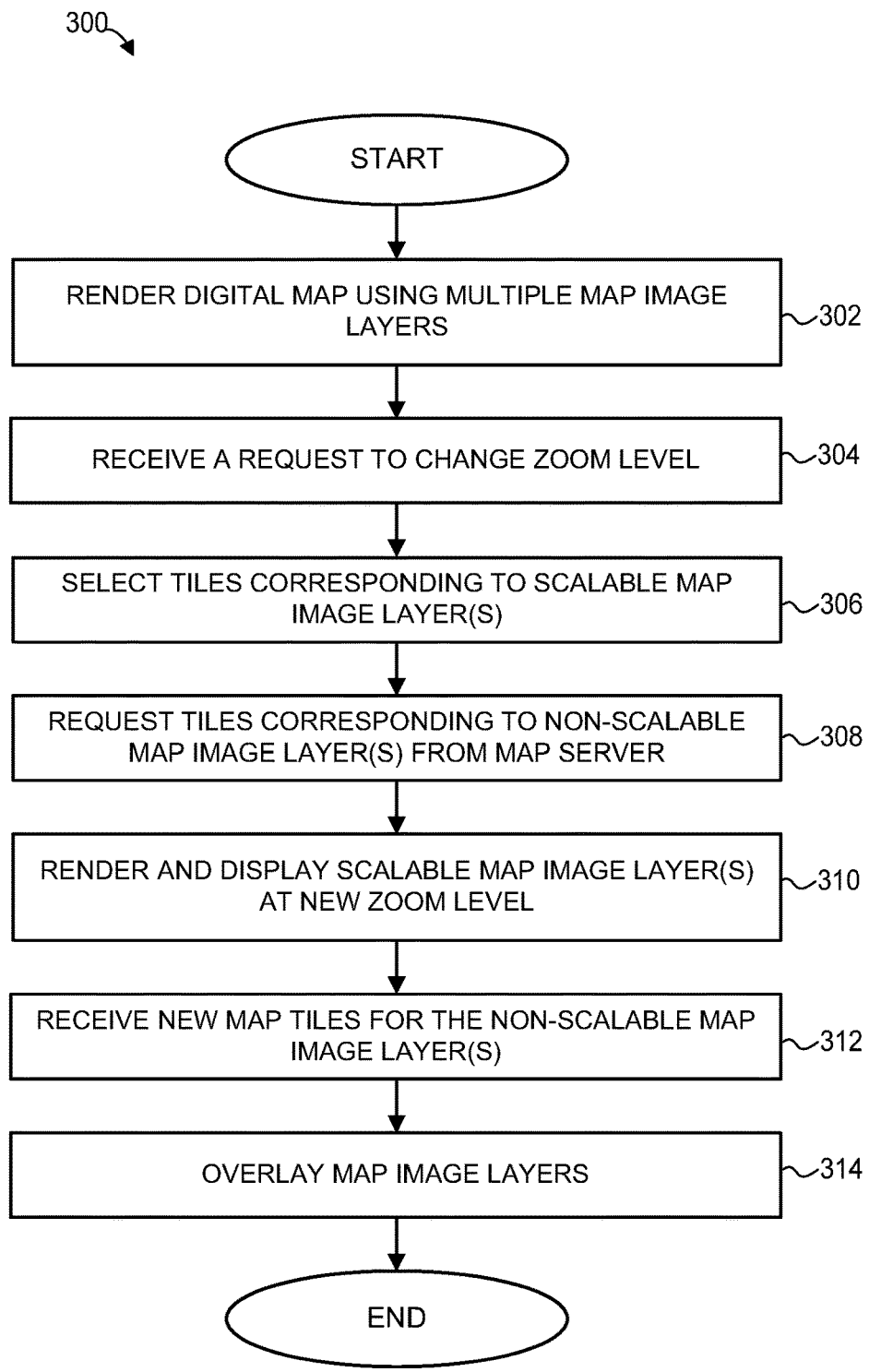
FIG. 5 is a flow diagram of an example method for generating map images at different zoom levels by rescaling some map image layers and not rescaling other map image layers, which can be implement in the client device of FIG. 1.

For further clarity, some of the split tile generation and rendering techniques are discussed next with reference to flow diagrams FIGS. 3-5. These flow diagrams illustrate methods that can be implemented as sets of instructions stored on a computer-readable medium and executable on one or more processors. The method of FIG. 3 are implemented in the server 12, and the methods of FIGS. 4 and 5 are implemented in the client device 14, in an example embodiment. However, these or similar methods also can be implemented in other suitable devices.

Referring to FIG. 3, a method 200 begins at block 202, where a request for map data is received from a client device. The request can indicate the desired geographic region and the desired zoom level. In some implementations, the request also can specify which of the map image layers are being requested. For example, whereas one request can indicate that all of the map image layers are required at the client device to generate a map image, another request can indicate that only the POI image layer is being requested. The client device can format the latter request if, for example, the client device detects a relatively low quality of network service, or if the client device is seeking to reduce the amount of data being transferred for financial reasons.

At block 204, map data is selected for rendering a digital map. The map data can correspond to all of the geographic features that belong in the geographic area specified by the client. To this end, one or several queries to a geospatial database can be executed.

Next, at blocks 206 and 208, map image layers are generated using respective subsets of the map data. For example, shorelines and bodies of water can be selected and rendered as one map image layer, roads can be selected and rendered as another map image layer, etc. In general, any desired number of map image layers can be used. The map image layers can be organized into tiles similar to "complete" map tiles discussed above. Tiling map image layers in this manner facilitates rescaling, combining map image layers, and other management functions.

When generating map image layers at block 206, a resolution can be selected in view of the geographic feature type of the map image layer. For example, a base map image layer can be rendered at a relatively low resolution, and a POI image layer can be rendered at a relatively high resolution. These resolutions can be defined as constants or can be configurable through the map database 18. In another embodiment, the desired resolutions are received as part of the request from the client device at block 202.

If it is determined at block 208 that all map image layers have been processed, the flow proceeds to block 210. Otherwise, the flow returns to block 206 to process another map image layer.

Next, at block 210, the map image layers are transmitted to a client device. In some implementations, some or all of the map image layers are compressed, with the compression technique for each map image layer selected in view of the type of geographic features depicted in the map image layer. Thus, certain map image layers are compressed using lossy techniques that can adversely affect quality but yield larger bandwidth savings, other map image layers are compressed using only lossless techniques, and some are not compressed at all. The method 200 completes after block 210.

Now referring to FIG. 4, a method 250 begins at block 252, where multiple map image layers are received form a server. The map image layers can have different resolutions. Further, tiles corresponding to different map image layers can arrive in an order that reflects the relative priority of these layers. For example, tiles of the base map image layer can arrive last because the client sometimes can reuse base map image tiles from a lower zoom level.

As discussed above, these map image layers can be compressed using different techniques, and accordingly can require different decompression techniques (block 254). In an embodiment, the decompression technique applied to a tile corresponding to a certain map image layer is specified as part of metadata for the tile.

At block 256, the map images layers are aligned and overlaid. The overlaying can proceed according to a pre-set order, such as the POI map image layer being on top of the road map image layer, and the road map image layer being on top of the base map image layer. The order can be controlled using z-values, for example. In many cases, however, tiles specific to map image layers have large gaps where no geographic features of the appropriate type are present. These gaps can be filled with transparent pixels.

FIG. 5 is a flow diagram of an example method 300 for generating map images at different zoom levels by rescaling tiles at some map image layers and not rescaling tiles at other map image layers.

The method 300 begins at block 302, where a digital map is rendered using multiple map image layers, similar to the method 250 discussed above. Next, a request to change the zoom level is received at block 304. The request can originate with the user, or the geographic application can generate this request automatically during navigation, for example. The request can indicate that the zoom level is to change from Z to Z+1, for example.

Next, at block 306, one or more scalable map image layers are selected for re-use at the new zoom level. The tiles corresponding to the other, non-scalable map image are requested from a map server at block 308. In other implementations or scenarios, however, new tiles for all map image layers are requested. If tiles corresponding to map image layers are found, and if these tiles depict geographic areas that will be in the viewport upon zooming, these tiles are scaled, rendered and displayed at block 310.

At block 312, new map tiles corresponding to non-scalable map image layers are received. These tiles are overlaid with the previously tiles at block 314. The method 300 completes after block 314.

Additional Considerations

Generally speaking, the techniques of this disclosure can be implemented portable devices, non-portable devices, standalone navigation systems, navigation systems built into head units of vehicles, wearable devices, etc. Further, these techniques in general are applicable to both outdoor and indoor maps. Still further, although the examples above referred primarily to the geographic application 46, these techniques similarly can be implemented in an application programming interface (API) which other software applications, such as web browsers, can invoke.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a cloud computing environment or as a software as a service (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Still further, the figures depict some embodiments of the system 100 for alignment of visual indicators on navigational maps and mapping system 700 in a mapping system for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the system 100 for alignment of visual indicators on navigational maps. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method in client devices for rendering digital maps, the method comprising:
   receiving, at a client device, a request to render a digital map of a certain geographic area;
   retrieving, from a memory of the client device, a first map image layer covering the geographic area, the first map image layer having a first resolution;
   requesting a second map image layer covering the same geographic area from a map server, via a communication network;
   receiving the second map image layer from the map server, the second map image layer having a second resolution different from the first resolution; and
   combining the first map image layer retrieved from the memory of the client device with the second map image layer received from the map server to generate a single digital map of the geographic area.

2. The method of claim 1, wherein combining the first map image layer with the second map image layer includes rescaling the first map image larger to match a zoom level of the second map image layer.

3. The method of claim 2, wherein receiving the request to render the digital map includes receiving a request to change a zoom level of the digital map; the method further comprising:

in response to the request to change the zoom level, selecting the first map image layer for rescaling and the second map image layer for retrieving from the map server, based on a type of map data illustrated by the first map image layer and the second map image layer.

4. The method of claim 3, wherein the first map image layer depicts bodies of land and water, and the second map image layer depicts roads.

5. The method of claim 1, wherein combining the first map image layer with the second map image layer includes overlaying the first map image layer and the second map image layer.

6. The method of claim 5, wherein overlaying the first map image layer and the second map image layer includes laying the first map image layer and the second map image layer according to an order based on a type of data included in the first map image layer and the second map image layer.

7. The method of claim 1, wherein each of the first map image layer and the second map image layer include a respective raster image with transparent portions for overlay with other map image layers.

8. The method of claim 1, wherein requesting the second map image layer includes requesting one or more tiles, each tile corresponding to a portion of the digital map of a certain fixed size, for a certain zoom level.

9. The method of claim 1, wherein the received second map image layer is compressed according to a compression scheme selected based on the type of geographic data depicted in the second map image layer.

10. The method of claim 1, further comprising applying a first caching and purging policy to the first map image layer and a second caching and purging policy to the second map image layer.

11. A computing device comprising:
one or more processors;
a display device communicatively coupled to the one or more processors; and
a memory including a non-transitory computer-readable medium storing instructions which, when executed by the one or more processors, cause the computing device:
receive a request to render a digital map of a certain geographic area,
retrieve a first map image layer covering the geographic area from the memory, the first map image layer having a first resolution,
request a second map image layer covering the same geographic area from a map server, via a communication network,
receive the second map image layer from the map server, the second map image layer having a second resolution different from the first resolution,
combine the first map image layer retrieved from the memory of the client device with the second map image layer received from the map server to generate a single digital map of the geographic area, and
display the digital map via the display device.

12. The computing device of claim 11, wherein to combine the first map image layer with the second map image layer, the instructions cause the computing device to rescale the first map image larger to match a zoom level of the second map image layer.

13. The computing device of claim 12, wherein receiving the request to render the digital map includes receiving a request to change a zoom level of the digital map; the instructions further configured to:

in response to the request to change the zoom level, select the first map image layer for rescaling and the second map image layer for retrieving from the map server, based on a type of map data illustrated by the first map image layer and the second map image layer.

14. The computing device of claim 13, wherein the first map image layer depicts bodies of land and water, and the second map image layer depicts roads.

15. The computing device of claim 1, wherein to combine the first map image layer with the second map image layer, the instructions cause the computing device to overlay the first map image layer and the second map image layer.

16. The computing device of claim 15, wherein overlaying the first map image layer and the second map image layer includes laying the first map image layer and the second map image layer according to an order based on a type of data included in the first map image layer and the second map image layer.

17. The computing device of claim 11, wherein each of the first map image layer and the second map image layer include a respective raster image with transparent portions for overlay with other map image layers.

18. The computing device of claim 11, wherein requesting the second map image layer includes requesting one or more tiles, each tile corresponding to a portion of the digital map of a certain fixed size, for a certain zoom level.

19. The computing device of claim 11, wherein the received second map image layer is compressed according to a compression scheme selected based on the type of geographic data depicted in the second map image layer.

20. The computing device of claim 11, the instructions further configured to apply a first caching and purging policy to the first map image layer and a second caching and purging policy to the second map image layer.

* * * * *